(12) United States Patent
Mincey et al.

(10) Patent No.: US 9,076,091 B2
(45) Date of Patent: Jul. 7, 2015

(54) RFID CIRCUITRY AND METHODS OF USING THE SAME TO PROVIDE INFORMATION OF EVENTS PERTAINING TO AN ELECTRONIC DEVICE

(75) Inventors: Tyler Mincey, San Francisco, CA (US); Andrew Hodge, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 1436 days.

(21) Appl. No.: 12/720,854

(22) Filed: Mar. 10, 2010

(65) Prior Publication Data

US 2011/0221575 A1    Sep. 15, 2011

(51) Int. Cl.
*G06K 19/07*    (2006.01)
*G06K 19/077*   (2006.01)

(52) U.S. Cl.
CPC ...... *G06K 19/0716* (2013.01); *G06K 19/07749* (2013.01); *H04Q 2213/13095* (2013.01)

(58) Field of Classification Search
CPC .................................. H04Q 9/00; H04B 5/00
USPC ............. 340/442, 573.6, 539.22, 10.34, 10.4, 340/539.12, 10.3, 10.1, 572.1; 342/42; 455/41.1, 566, 518; 369/30.05; 700/83
See application file for complete search history.

(56) References Cited

U.S. PATENT DOCUMENTS

| | | | |
|---|---|---|---|
| 5,461,385 A * | 10/1995 | Armstrong ...................... 342/42 |
| 6,148,241 A * | 11/2000 | Ludtke et al. ................... 700/83 |
| 6,249,212 B1 * | 6/2001 | Beigel et al. ............... 340/10.34 |
| 6,720,866 B1 * | 4/2004 | Sorrells et al. ............... 340/10.4 |
| 6,944,424 B2 | 9/2005 | Heinrich et al. |
| 8,441,338 B2 * | 5/2013 | Naressi et al. ............... 340/10.1 |
| 2005/0037707 A1 * | 2/2005 | Lewis .......................... 455/41.1 |
| 2006/0006991 A1 * | 1/2006 | Tyndall et al. ................. 340/442 |
| 2006/0012484 A1 * | 1/2006 | Claude ........................ 340/573.6 |
| 2006/0132302 A1 * | 6/2006 | Stilp ......................... 340/539.22 |
| 2007/0008113 A1 * | 1/2007 | Spoonhower et al. ... 340/539.12 |
| 2007/0008141 A1 | 1/2007 | Sweetland |
| 2007/0090926 A1 | 4/2007 | Potyrailo et al. |
| 2007/0279229 A1 * | 12/2007 | Shaffer et al. .............. 340/572.1 |
| 2008/0056075 A1 * | 3/2008 | Kalis .......................... 369/30.05 |
| 2009/0075592 A1 * | 3/2009 | Nystrom et al. ............. 455/41.1 |
| 2009/0234472 A1 * | 9/2009 | Pyle ................................. 700/94 |
| 2009/0253464 A1 * | 10/2009 | Yamaguchi et al. .......... 455/566 |

* cited by examiner

*Primary Examiner* — Steven Lim
*Assistant Examiner* — Kaleria Knox
(74) *Attorney, Agent, or Firm* — Meyertons, Hood, Kivlin & Goetzel, P.C.

(57) ABSTRACT

An electronic device with RFID circuitry is provided. The electronic device is operative to instruct the RFID circuitry to provide a desired message indicative of an event associated with the electronic device. For example, if the electronic device experienced some type of system failure, the device may instruct the RFID circuitry to provide a message indicative of that failure.

20 Claims, 6 Drawing Sheets

RFID CIRCUITRY AND METHODS OF USING THE SAME TO PROVIDE INFORMATION OF EVENTS PERTAINING TO AN ELECTRONIC DEVICE

FIELD OF THE INVENTION

This relates to radio frequency identification (RFID) circuitry, and more particularly, to electronic devices that can selectively cause the RFID circuitry to provide a message indicative of an event associated with the device.

BACKGROUND OF THE DISCLOSURE

RFID circuitry is used in a variety of different applications. For example, RFID circuitry can be used in connection with highway toll systems, inventory management systems, badge entry systems, public transportation systems, and payment systems. In each of these applications, the RFID circuitry may provide information contained therein to an RFID reader. The information provided by the RFID circuitry may be fixed, thereby limiting the device's RFID communication repertoire. What is needed is an electronic device that can cause its RFID circuitry to selectively provided different information.

SUMMARY OF THE DISCLOSURE

Electronic devices having RFID circuitry and methods for using RFID circuitry are provided. The RFID circuitry can be controlled or programmed to provide one or more messages. The message(s) provided by the RFID circuitry may be based on events that occur within the electronic device. The events may include trigger events that are detected by a sensor system such as a water detection system. The trigger events may represent events that can lead to or cause device failure, or otherwise compromise operation of the device. The events may also include software events that are executed by the electronic device. These events may be captured as quantifiable messages indicative of such events. For example, software events may include user interactions with the device (e.g., an indication of the last song played), notifications (e.g., status indications such as a new message notification), and user specified messages.

The specificity of messages provided by the RFID circuitry may vary. The message may be generic or tailored to the event. For example, in one embodiment, the electronic device may instruct the RFID circuitry to provide a generic error message when a trigger event is received. In another embodiment, the electronic device may instruct the RFID circuitry to provide a message tailored to a received trigger event (e.g., provide a message indicating that the device has been damaged by water in response to receiving a trigger event from a water detection system). In yet another embodiment, the electronic device may instruct the RFID circuitry to provide messages based on received software events.

Various electronic devices with varying RFID circuitry arrangements may be provided. These RFID arrangements may use passive RFID circuitry, which enables the electronic device to provide messages via its RFID circuitry when powered off, disabled, or operating in a low power state. This enables the electronic device to provide passive messages without incurring substantial energy cost. For example, if the device has been damaged, the RFID circuitry can provide a message indicating that has been damaged even though the device is no longer functional.

In one embodiment, the electronic device can include circuitry that selects which message or messages are provided by the RFID circuitry when it is read by an RFID reader. In this embodiment, the RFID circuitry may include first memory for storing first data and second memory for storing second data, and selection circuitry operative to select between the first memory and the second memory based on a selection signal. The electronic device can include control circuitry that provides the selection signal to the RFID circuitry in response to receiving an event. The data stored in the memory may be preprogrammed. Thus, by enabling selection of one of the preprogrammed memories, the appropriate message can be quickly selected prior to a device failure.

In another embodiment, the electronic device can write data to memory contained in the RFID circuitry, thereby enabling the electronic device to provide custom tailored messages. In this embodiment, RFID circuitry can include rewritable memory. The electronic device can also include control circuitry operative to provide data to be written to the rewritable memory in response to receiving an event.

In yet another embodiment, the RFID circuitry can include both preprogrammed memory and rewritable memory. This provides control circuitry the option of selecting the appropriate memory, writing data to memory, or both, in response to receiving one or more events. For example, the control circuitry may update data in the rewritable memory based on received software events and select one of the preprogrammed memories based on a received trigger event.

BRIEF DESCRIPTION OF THE DRAWINGS

The above and other features of the present invention, its nature and various advantages will become more apparent upon consideration of the following detailed description, taken in conjunction with the accompanying drawings, in which like reference characters refer to like parts throughout, and in which:

FIG. 1 is a block diagram of an electronic device providing information to a RFID reader according to an embodiment of the invention;

FIG. 2 shows a simplified block diagram of an illustrative electronic device according to an embodiment of the invention;

FIGS. 3-6 show block diagram of electronic devices having different RFID circuitry configuration according to various embodiments of the invention;

FIGS. 7 and 8 show illustrative flow charts showing steps that may be performed in accordance with embodiments of the invention; and FIG. 9 shows a block diagram of a system in accordance with an embodiment of the invention.

DETAILED DESCRIPTION OF THE DISCLOSURE

FIG. 1 shows an illustrative block diagram of electronic device 100 having RFID circuitry 115 and RFID reader 199. Electronic device 100 can be any suitable device having a power source such as, for example, a media player (e.g., an MP3 player such an iPod™ available from Apple Inc. of Cupertino, Calif.), a telephonic device, a PDA, a smart phone (e.g., an iPhone™ available from Apple Inc. of Cupertino, Calif.), a computer such as a laptop, netbook, or desktop computer. Electronic device 100 can be a portable device that is relatively easy for users to carry on their person or in a bag. Electronic device 100 can be stationary or fixed device such as a desktop computer, a monitor, or a printer.

Figure 1:
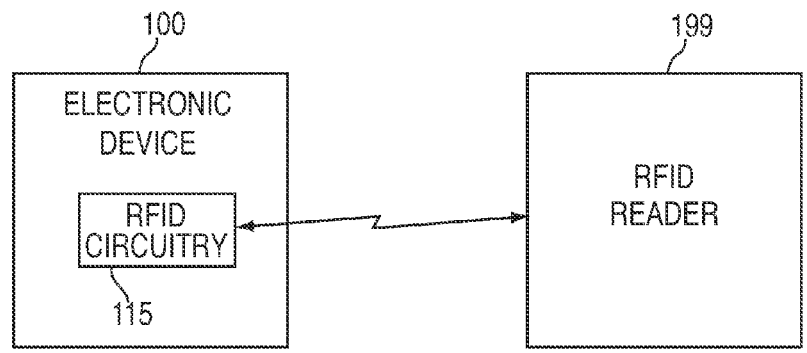

Electronic device 100 can include RFID circuitry 115. Electronic device can include more than one RFID circuit, but only one is shown to avoid overcrowding the drawing. RFID circuitry 115 can be any suitable RFID circuit. In one embodiment, RFID circuitry 115 may be a passive RFID circuit. Passive RFID circuitry enables a reader such as RFID reader 199 to obtain the data stored therein without requiring electronic device 100 to supply any power to RFID circuitry 115. In another embodiment, RFID circuitry 115 can be an active RFID circuit. Active RFID circuitry requires power from electronic device 100 to provide data stored therein to another device (e.g., an RFID reader).

In embodiments described herein, RFID circuitry 115 can be controlled or programmed to provide one or more messages. In one embodiment, electronic device 100 can include circuitry that can select which message or messages that may be provided by RFID circuitry 115. In this embodiment, the messages may already be preprogrammed into memory of RFID circuitry 115. In another embodiment, electronic device 100 can provide data that can be written into memory of RFID circuitry 115. This data may contain one or more messages that are provided by RFID circuitry 115 to, for example, be read by RFID reader 199.

RFID reader 199 can be any device suitable for reading data from RFID circuitry 115. For example, RFID reader 199 can be a stand-alone RFID reader, a computer such as a laptop or desktop computer having RFID reading circuitry contained therein, or a device similar to or the same as electronic device 100 that has RFID reading circuitry. RFID reader 199 may be a multifunctional device that can read data stored on RFID circuitry 115 and perform other features for electronic device 100 (e.g., charge a battery). An example of a multifunctional device may be an inductive charging pad having an integrated RFID reader. In another embodiment, RFID reader 199 may be an accessory device that can connect to a computer.

An RFID programmer (not shown) can be used to wirelessly program information into the memory of RFID circuitry 115. Such programming can be performed, for example, at the RFID circuitry manufacturing facility, the electronic device manufacturing facility, or both. For example, the RFID circuitry manufacturing facility may program in a unique RFID identification information into memory. This unique RFID identification information may be permanently stored in memory. The electronic device manufacturing facility may program additional information in memory such as a device identification number, which may be permanently stored in memory. In some embodiments, one or more error messages may be programmed into RFID circuitry 115 memory. These error messages may be permanently stored and cannot be overwritten by device 100.

Figure 2:
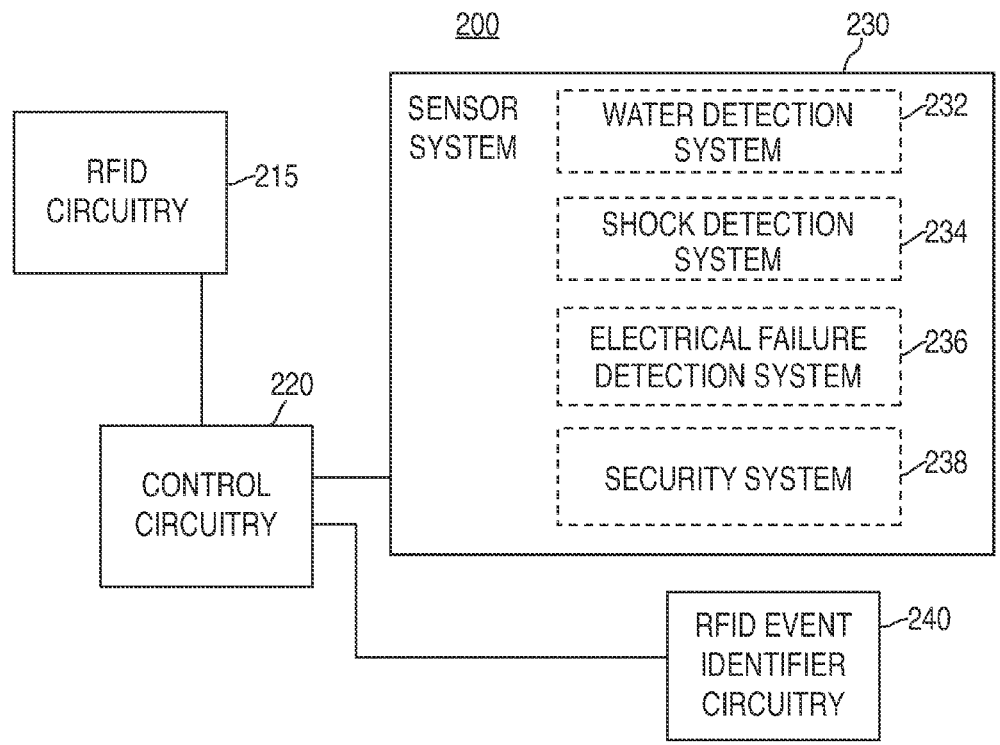

FIG. 2 shows an illustrative block diagram of components of an electronic device 200. As shown, electronic device 200 can include RFID circuitry 215, control circuitry 220, sensor system 230, and RFID event handler circuitry 240. In some embodiments, sensor system 230 can be omitted, and in other embodiments, RFID event handler circuitry 240 can be omitted. Control circuitry 220 may communicate with RFID circuitry 215, sensor system 230, and RFID event handler circuitry 240 over any suitable number or type of communications path. During operation, control circuitry 220 can be responsive to trigger events received from sensor system 230 and software events received from RFID event handler circuitry 240. Based on the event received, control circuitry 220 can communicate with RFID circuitry 215 to cause RFID circuitry 215 to provide one or more desired messages.

RFID circuitry 215 may have any of the features of RFID circuitry 115, discussed above. RFID circuitry 215 may operative to receive signals and/or data from control circuitry 220.

Sensor system 230 can be any system operative to monitor various aspects of electronic device 200 which may indicate the cause of device failure or malfunction, or otherwise compromise operation of the device. Such aspects can include monitoring of physical and electrical conditions existing within or endured by device 200. The aspects can also include monitoring the security of device 200. When sensor system 230 monitors an event, the occurrence of that event may be communicated to control circuitry 220 as a trigger event. The manner in which control circuitry 220 handles the trigger event may vary. For example, in one embodiment, the trigger event may flag the occurrence of a device malfunction, in which case control circuitry 220 may cause RFID circuitry 215 to provide a message indicating that device 210 has experienced an error. In another embodiment, control circuitry 220 may recognize the trigger event is caused by a particular event (e.g., water infiltration) and may cause RFID circuitry 215 to provide a message indicating that device 200 has been damaged by the particular event. Control circuitry 220 may select the message to be provided by instructing RFID circuitry 215 to select a memory already preprogrammed with the desired error message. In another approach, control circuitry may write the desired error message to memory in RFID circuitry 215.

Sensor system 230 can include one or more of the following subsystems: water detection system 232, shock detection system 234, electrical failure detection system 236, and security system 238. Water detection system 232 may detect the presence of a predetermined level of moisture, and upon such detection may communicate a trigger event to control circuitry 220. Shock system 234 may detect whether device 200 has been subjected to a shock (e.g., a dropped device) that exceeds a predetermined threshold, and provides a trigger event to control device 220 when that threshold is exceeded. Electrical failure detection system 236 may determine when device 200 experiences electrical failure and report such a failure as a trigger event. Security system 238 may detect attempts or breaches of device 200 security and report security breaches or attempts thereof as a trigger event.

RFID event handler circuitry 240 can be operative to monitor or catalog quantifiable events occurring in software being executed on device 200. Such software events can include events executed by device 200 such as, for example, user interactions with media (e.g., playback of songs, internet navigation, purchase of assets), notification events such as, for example, battery charge status, new email, new SMS text message, or new voicemail message, or any other suitable event that can be quantified and stored as a message in memory of RFID circuitry 215. When a quantifiable software event occurs, event handler circuitry 240 may provide the event trigger to control circuitry 220, which may cause RFID circuitry 215 to provide information indicative of the event.

Event handler circuitry 240 may be operative to update data stored in RFID circuitry 215 at predetermined intervals or in response to an occurrence of an event. If desired, a user may specify which events he or she would like stored in RFID circuitry 215. For example, the user may desire to have event handler circuitry update memory in RFID circuitry 215 with the last song played. As another example, a user may instruct event handler 240 to store user-selected information in RFID circuitry 215 (e.g., user contact information, an advertisement, payment card information, or a URL).

Figure 3:
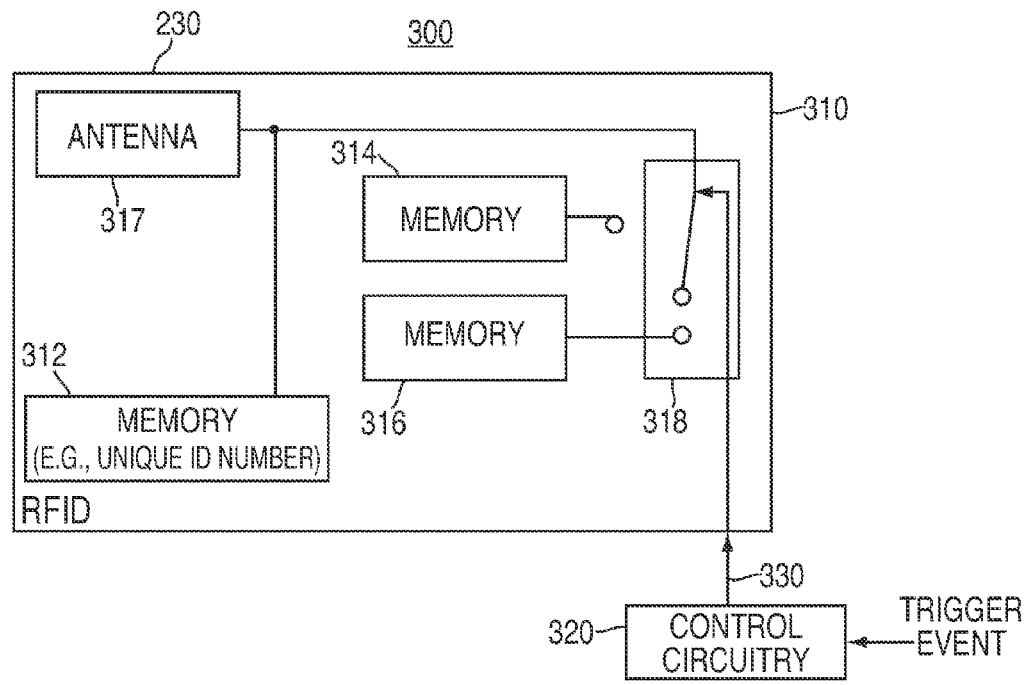

FIG. 3 shows device 300 having RFID circuitry 310 and control circuitry 320. RFID circuitry 310 is a passive RFID circuit. RFID circuitry 310 can include permanent memory 312, first preprogrammed memory 314, second preprogrammed memory 316, antenna 317, and selection circuitry 318. Each memory in device 300 may be one-time programmable memory. Thus, the data stored therein cannot be overwritten by device 300. Permanent memory 312 may have stored therein information pertaining to RFID circuitry 310 such as a RFID identification number. First preprogrammed memory 314 may have stored therein information pertaining to the identification of device 300 such as device identification number. Second preprogrammed memory 316 may have stored therein an error message. The error message may be, for example, a generic error message.

When RFID circuitry 315 is read by an RFID reader, it can provide the contents of memory 312 and one of either first preprogrammed memory 314 or second preprogrammed memory 316. Selection circuitry 318 is operative to select whether the contents of first preprogrammed memory 314 or second preprogrammed memory 316 are provided. Selection circuitry 318 selects first memory 314 or second memory 316 based on a selection signal received from control circuitry 320. Control circuitry 320 can control the state (e.g., logic high or low) of the selection signal based on whether a trigger event is received.

For example, during normal device operation, control circuitry 320 may maintain the selection signal at a logic low state. This can result in selection circuitry 318 selecting first preprogrammed memory 314. In the event of a received trigger event, control circuitry can assert the selection signal by changing it to a logic high state, which can result in selection circuitry 318 selecting second preprogrammed memory 316.

Communications path 330 may electrically couple RFID 315 and control circuitry 320. Communications path 330 may be a wire that conducts a voltage representative of the selection signal. This promotes high speed communication because memory selection (between first memory 314 and second memory 316) is based on whether path 330 is pull LOW or HIGH. Such high speed communication may be desirable in situations where device 300 is about to completely fail and the error message in second memory 316 needs to be selected before failure. This communication (i.e., selection of a memory) may be faster relative to the time it may take to write data to memory in an RFID circuit (discussed below in connection with FIG. 5.

Figure 4:
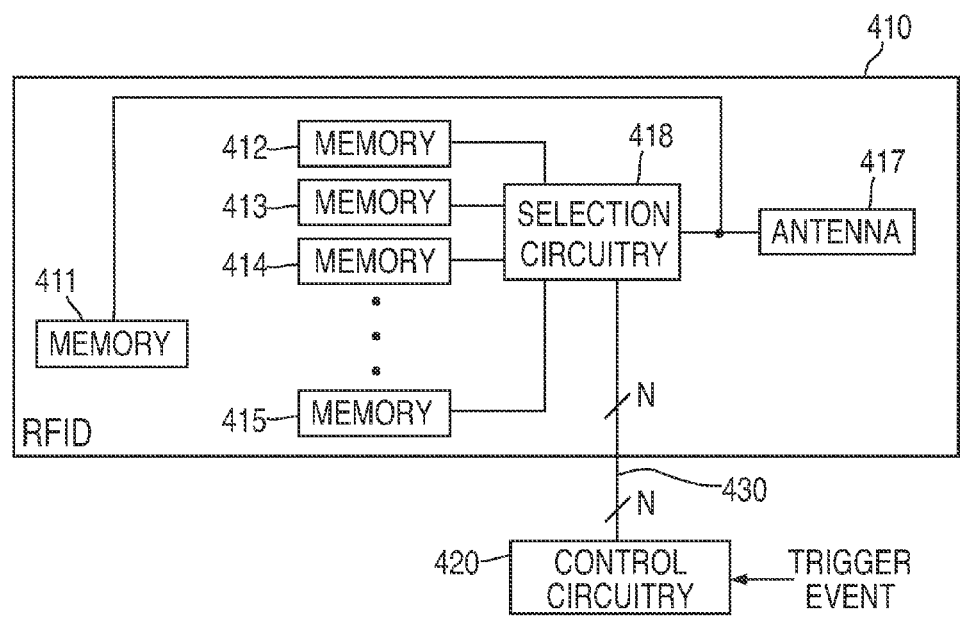

FIG. 4 shows another device 400 having RFID circuitry 410 and control circuitry 420. RFID circuitry 410 can include permanent memory 411 (which may have stored therein information pertaining to the RFID itself such as a RFID identification number), preprogrammed memory 412-415, antenna 417, and selection circuitry 418. Although only four preprogrammed memories are shown in the FIG., it is understood that any number of such preprogrammed memories may be included in RFID circuitry 410. Preprogrammed memory 412-415 may be one-time programmable memory that is programmed by a RFID programming device, for example, at the device manufacturing facility. In another embodiment, the preprogrammed memory 412-415 may be programmed locally by device 300, but once programmed, it may not be rewritten again. One memory (e.g., memory 412) may be programmed with device specific information and the other memory (e.g., memory 413-415) may be programmed with different error messages. By providing multiple memories each having specific messages stored therein, a higher granularity of message delivery can be obtained. For example, one memory may contain a message relating to moisture intrusion, another memory may contain a message relating to excessive shock, and yet another message may relate to electrical failure.

Control circuitry 420 may instruct selection circuitry 418 to select which one of memories 412-415 is selected to provide its stored contents. Control circuitry 420 may supply a selection signal over communications path 430 to cause selection circuitry to select the appropriate memory. Communications path 430 may include any number of or any type of paths. In one embodiment, communications path may include N lines interconnecting RFID circuitry 410 and control circuitry 420. Control circuitry 420 is operative to assert certain of those lines to cause selection circuitry 418 to select a desired memory.

During normal device 400 operation, control circuitry 420 may cause selection circuitry 418 to select a memory that does not include an error message. Assume, for example, that this is memory 412. When control circuitry 420 receives a trigger event, control circuitry 420 may ascertain what type of trigger event it is and provide a selection signal corresponding to that type of trigger event to selection circuitry 418. Selection circuitry 418 then receives the selection signal and selects the appropriate memory. For example, if the trigger event was related to a first type of error, the selection signal would cause selection circuitry 418 to select the memory containing a message corresponding to that first type of error.

Figure 5:
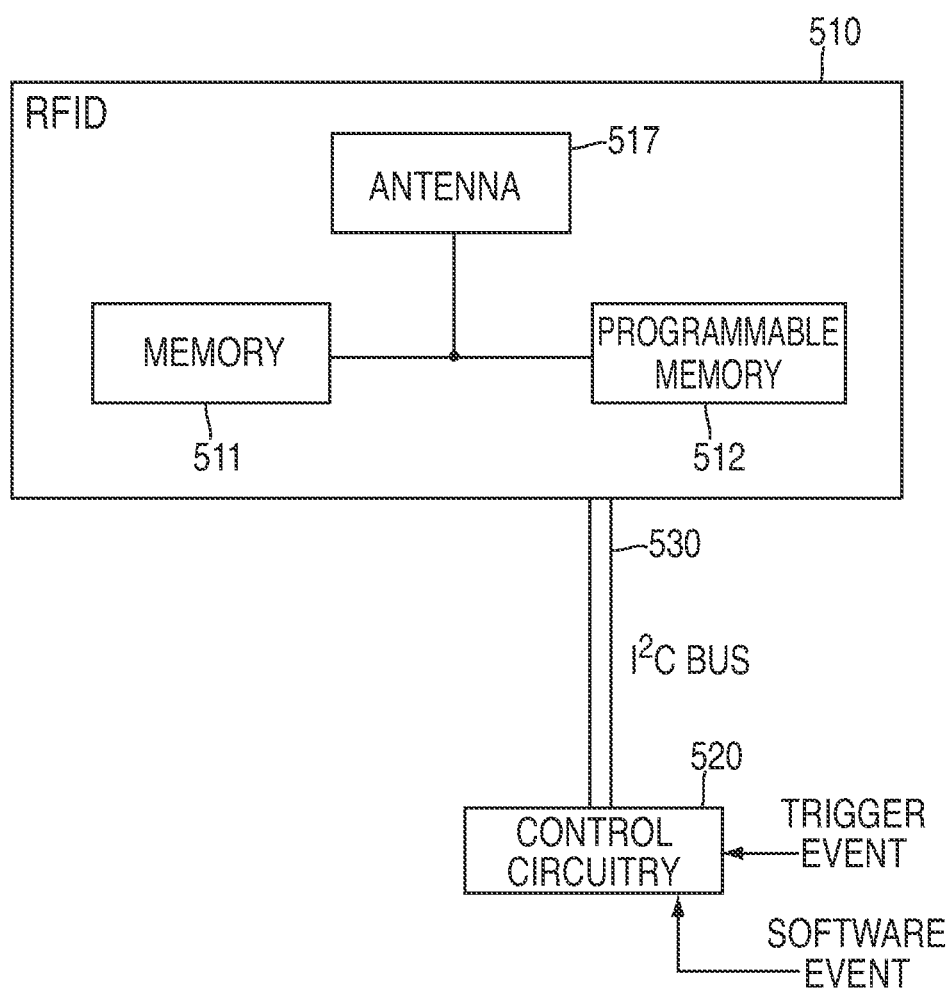

FIG. 5 shows yet another device 500 having RFID circuitry 510 and control circuitry 520. RFID circuitry 510 can include permanent memory 511 (e.g., for storing RFID specific information and/or device specific information), rewritable memory 512, and antenna 517. If desired, preprogrammed memory (not shown) may also be included. Rewritable memory 512 may store information written thereto by control circuitry 520. Rewritable memory 512 may store any information suitable for being provided as a message by RFID circuitry 510. For example, rewritable memory 512 may store error messages and various software events (discussed above in connection with FIG. 3).

Control circuitry 520 can communicate with RFID circuitry 510 using communications path 530. Communications path 530 may enable data communications between control circuitry 520 and RFID circuitry 510. For example, communications path 530 may be an I²C bus, a MIPI Bus, or a DMA bus.

Control circuitry 520 may be operative to receive trigger events and software events, process those received events, and communicate appropriate data to RFID circuitry 510. The trigger events may be received from a sensor system (e.g., such as sensor system 230 of FIG. 2). For example, if the sensor system detects a water detection event, it may inform control circuitry 520 of that event, and, in response, control circuitry 520 may write a message in memory 512 specifying that water has been detected. The software events may be received, for example, from RFID event handler circuitry (e.g., such event handler 240 of FIG. 2). For example, the event handler may monitor various software events (e.g., the last song played) and provide those events to control circuitry 520, which may then pass data identifying that event to RFID circuitry 510.

The ability to write data to memory 512 of RFID circuitry 510 provides limitless opportunity to communicate messages of varying specificity. For example, when a trigger event occurs, control circuitry 520 can include a time stamp of the received trigger event, various device operating parameters, the specific cause of the trigger event, and any other suitable information in a message to be written to memory 512 of RFID circuitry 510. Other information, such as the software event information, may be updated at predetermined time intervals by writing updated data to memory 512 of RFID circuitry 510.

Figure 6:
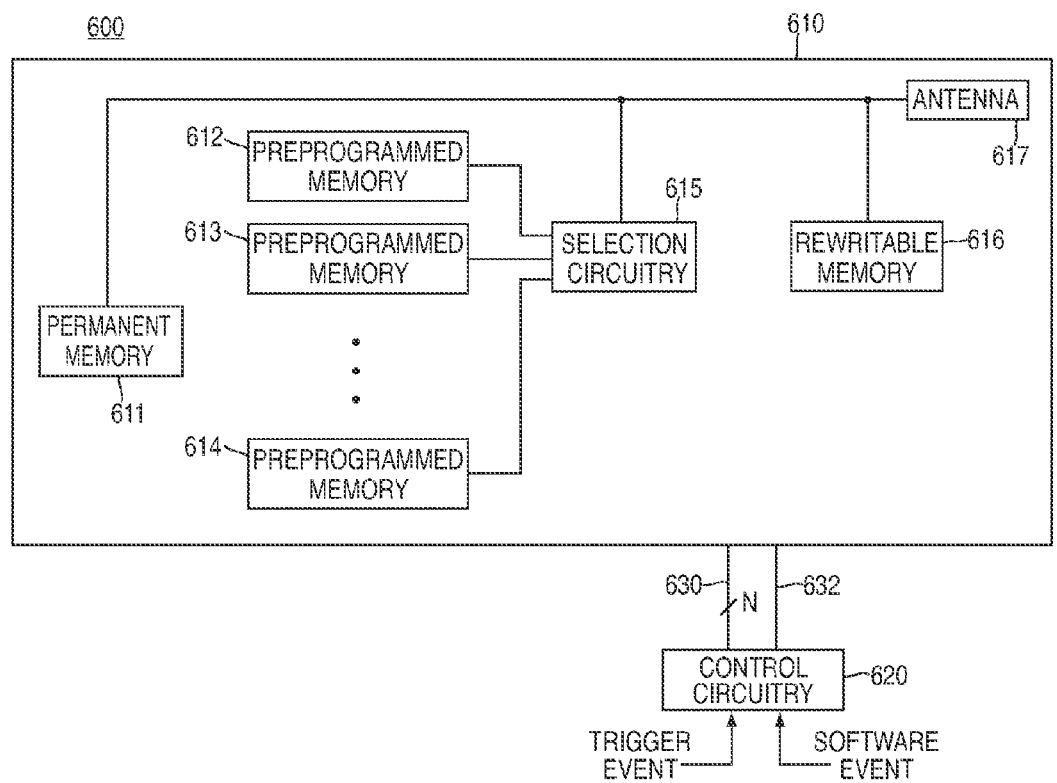

FIG. 6 shows a device 600 having RFID circuitry 610 and control circuitry 620. Device 600 may be constructed to represent a hybrid of device 500 and device 300 or device 400. In particular, RFID circuitry 610 may include permanent memory 611, preprogrammed memory 612, 613, and 614, selection circuitry 615, rewritable memory 616, and antenna 617. Control circuitry 620 can communicate with RFID circuitry 610 using communications paths 630 and 632. Communications path 630 may be faster than communications path 632 and may used to transmit a selection signal to selection circuitry 615. Communications path 632 may enable control circuitry 620 to provide data to be written in rewritable memory 616.

During operation, control circuitry 620 has the options of selecting one of memories 612-614, writing data to rewritable memory 616, or using both options to have RFID circuitry 610 provide the desired message(s). In one embodiment, control circuitry 620 may update rewritable memory 616 with software events, but when a trigger event is received, control circuitry 620 may provide a selection signal to select an appropriate one of preprogrammed memories 612-614. In another embodiment, if a trigger event is received, control circuitry 620 may provide the appropriate selection signal and write an error message in rewritable memory 616.

Figure 7:
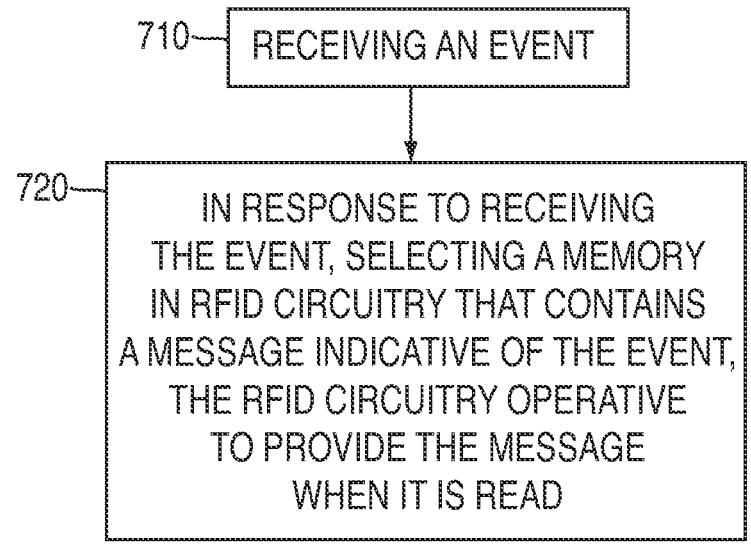

FIG. 7 shows an illustrative flowchart of steps that may be performed according to an embodiment of the invention. Beginning with step 710, an event is received. The event may be a trigger event received from a sensor system or a software event received from an event handler. In response to receiving the event, at step 720, a memory in the RFID circuitry is selected that contains a message indicative of the event. Once this memory is selected, the RFID circuitry is operative to provide that message when it is read, for example, by an RFID reading device. Depending on the RFID circuitry embodiment (e.g., FIG. 3 or FIG. 4), memory selection may be made between two memories or between two or more memories. In the two memory embodiment, an event may cause control circuitry to select the memory containing a generic error message. In the two or more memory embodiment, an event may cause control circuitry to select the memory containing a message indicative of the event (e.g., an event specific message). In this embodiment, the control circuitry may use a lookup table to determine an appropriate selection signal that should be provided the RFID circuitry based on the received event.

Figure 8:
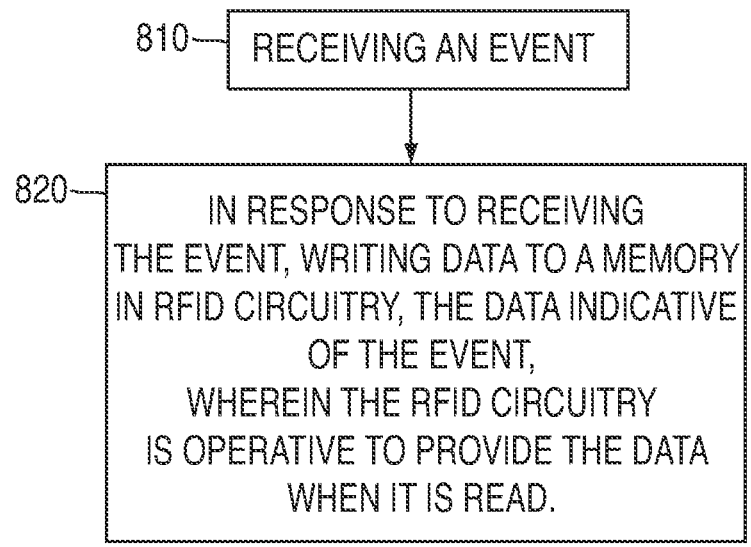

FIG. 8 shows a flowchart illustrating steps that may be performed according to an embodiment of the invention. Beginning at step 810, an event is received. The event may be a trigger event received from a sensor system or a software event received from an event handler. In response to receiving the event, at step 820, data is written to a memory of RFID circuitry. The data is indicative of the event and is provided by the RFID circuitry when it is read, for example, by a RFID reader. For example, if an event is caused by a battery failure, then the control circuitry may write a message in the memory of the RFID circuitry indicating that the battery has failed.

Figure 9:
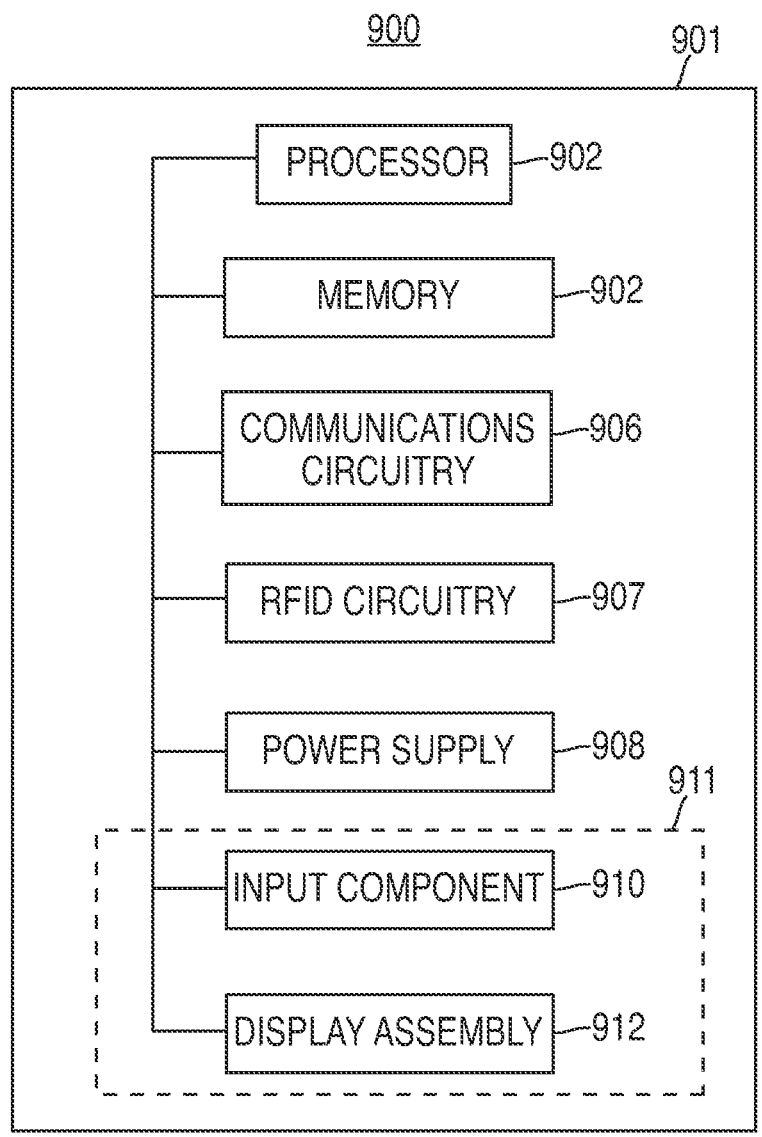

FIG. 9 is a schematic view of an illustrative electronic device 900 having RFID circuitry. Electronic device 900 may be any portable, mobile, or hand-held electronic device configured to present visible information on a display assembly wherever the user travels. Alternatively, electronic device 900 may not be portable at all, but may instead be generally stationary. Electronic device 900 can include, but is not limited to, a music player, video player, still image player, game player, other media player, music recorder, movie or video camera or recorder, still camera, other media recorder, radio, medical equipment, domestic appliance, transportation vehicle instrument, musical instrument, calculator, cellular telephone, other wireless communication device, personal digital assistant, remote control, pager, computer (e.g., desktop, laptop, tablet, server, etc.), monitor, television, stereo equipment, set up box, set-top box, boom box, modem, router, keyboard, mouse, speaker, printer, and combinations thereof. In some embodiments, electronic device 900 may perform a single function (e.g., a device dedicated to displaying image content) and, in other embodiments, electronic device 900 may perform multiple functions (e.g., a device that displays image content, plays music, and receives and transmits telephone calls).

Electronic device 900 may include a processor or control circuitry 902, memory 904, communications circuitry 906, RFID circuitry 907, power supply 908, input component 910, and display assembly 912. Electronic device 900 may also include a bus 903 that may provide a data transfer path for transferring data and/or power, to, from, or between various other components of device 900. In some embodiments, one or more components of electronic device 900 may be combined or omitted. Moreover, electronic device 900 may include other components not combined or included in FIG. 9. For example, electronic device 900 may include motion detection circuitry, light sensing circuitry, positioning circuitry, or several instances of the components shown in FIG. 9. For the sake of simplicity, only one of each of the components is shown in FIG. 9.

Memory 904 may include one or more storage mediums, including for example, a hard-drive, flash memory, permanent memory such as read-only memory ("ROM"), semi-permanent memory such as random access memory ("RAM"), any other suitable type of storage component, or any combination thereof. Memory 904 may include cache memory, which may be one or more different types of memory used for temporarily storing data for electronic device applications. Memory 904 may store media data (e.g., music, image, and video files), software (e.g., for implementing functions on device 900), firmware, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device 900 to establish a wireless connection), subscription information (e.g., information that keeps track of podcasts or television shows or other media a user subscribes to), contact information (e.g., telephone numbers and e-mail addresses), calendar information, any other suitable data, or any combination thereof.

Communications circuitry 906 may be provided to allow device 900 to communicate with one or more other electronic devices or servers using any suitable communications protocol. For example, communications circuitry 906 may support Wi-Fi™ (e.g., an 802.11 protocol), Ethernet, Bluetooth™, high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), hypertext transfer protocol ("HTTP"), BitTorrent™, file transfer protocol ("FTP"), real-time transport protocol ("RTP"), real-time streaming protocol ("RTSP"), secure shell protocol ("SSH"), any other communications protocol, or any combination thereof. Communications circuitry 906 may also include circuitry that can enable device 900 to be electrically coupled to another device (e.g., a computer or an accessory device) and communicate with that other device, either wirelessly or via a wired connection.

RFID circuitry 907 may be any suitable radio frequency identification circuitry that may be used to communicate one or more desired messages (e.g., error messages, user specified information, notifications, etc.) to an RFID reader. RFID circuitry 907 may be responsive to commands provided, for example, by processor 902.

Power supply 908 may provide power to one or more of the components of device 900. In some embodiments, power supply 908 can be coupled to a power grid (e.g., when device 900 is not a portable device, such as a desktop computer). In some embodiments, power supply 908 can include one or more batteries for providing power (e.g., when device 900 is a portable device, such as a cellular telephone). As another example, power supply 908 can be configured to generate power from a natural source (e.g., solar power using one or more solar cells).

One or more input components 910 may be provided to permit a user to interact or interface with device 900. For example, input component 910 can take a variety of forms, including, but not limited to, a track pad, dial, click wheel, scroll wheel, touch screen, one or more buttons (e.g., a keyboard), mouse, joy stick, track ball, and combinations thereof. For example, input component 910 may include a multi-touch screen. Each input component 910 can be configured to provide one or more dedicated control functions for making selections or issuing commands associated with operating device 900.

Electronic device 900 may also include one or more output components that may present information (e.g., textual, graphical, audible, and/or tactile information) to a user of device 900. An output component of electronic device 900 may take various forms, including, but not limited, to audio speakers, headphones, audio line-outs, visual displays, antennas, infrared ports, rumblers, vibrators, or combinations thereof.

For example, electronic device 900 may include display assembly 912 as an output component. Display 912 may include any suitable type of display or interface for presenting visible information to a user of device 900. In some embodiments, display 912 may include a display embedded in device 900 or coupled to device 900 (e.g., a removable display). Display 912 may include, for example, a liquid crystal display ("LCD"), a light emitting diode ("LED") display, an organic light-emitting diode ("OLED") display, a surface-conduction electron-emitter display ("SED"), a carbon nanotube display, a nanocrystal display, any other suitable type of display, or combination thereof. Alternatively, display 912 can include a movable display or a projecting system for providing a display of content on a surface remote from electronic device 900, such as, for example, a video projector, a head-up display, or a three-dimensional (e.g., holographic) display. As another example, display 912 may include a digital or mechanical viewfinder. In some embodiments, display 912 may include a viewfinder of the type found in compact digital cameras, reflex cameras, or any other suitable still or video camera.

It should be noted that one or more input components and one or more output components may sometimes be referred to collectively as an I/O interface (e.g., input component 910 and display 912 as I/O interface 911). It should also be noted that input component 910 and display 912 may sometimes be a single I/O component, such as a touch screen that may receive input information through a user's touch of a display screen and that may also provide visual information to a user via that same display screen.

Processor 902 of device 900 may control the operation of many functions and other circuitry provided by device 900. For example, processor 902 may receive input signals from input component 910 and/or drive output signals to display assembly 912. Processor 902 may load a user interface program (e.g., a program stored in memory 904 or another device or server) to determine how instructions or data received via an input component 910 may manipulate the way in which information is provided to the user via an output component (e.g., display 912). For example, processor 902 may control the viewing angle of the visible information presented to the user by display 912 or may otherwise instruct display 912 to alter the viewing angle.

Electronic device 900 may also be provided with a housing 901 that may at least partially enclose one or more of the components of device 900 for protecting them from debris and other degrading forces external to device 900. In some embodiments, one or more of the components may be provided within its own housing (e.g., input component 910 may be an independent keyboard or mouse within its own housing that may wirelessly or through a wire communicate with processor 902, which may be provided within its own housing).

Thus it is seen that the use of RFID circuitry in electronic devices are provided. It is understood that the steps shown in the flowcharts discussed above are merely illustrative and that existing steps may be modified, added or omitted. Those skilled in the art will appreciate that the invention can be practiced by other than the described embodiments, which are presented for purposes of illustration rather than of limitation, and the invention is limited only by the claims which follow.

What is claimed is:

1. A method for using Radio Frequency Identification (RFID) circuitry in an electronic device, the method comprising:
   receiving a software event, the software event indicative of a user interaction with the electronic device, wherein the software event comprises an event occurring in software being executed by the electronic device; and
   in response to receiving the software event, writing data to a memory in RFID circuitry, the data indicative of the software event, and wherein the RFID circuitry is operative to provide the data when it is read, wherein the providing the data occurs when the electronic device is powered off.

2. The method of claim 1, wherein the software event is indicative of a media item that has been played back on the electronic device.

3. The method of claim 1, wherein the software event is received at a predetermined time interval.

4. An electronic device comprising:
   Radio Frequency Identification (RFID) circuitry comprising:
      an antenna;
      a first memory for storing first data;
      a second memory for storing second data; and
      selection circuitry operative to select either the first or second memory for providing either the first data or the second data for transmission by the antenna, wherein the selection is based on a selection signal; and
   a processor operative to provide the selection signal to the RFID circuitry, wherein a state of the selection signal changes in response to receiving a software event, wherein the software event comprises a notification of a communication received by the electronic device.

5. The electronic device of claim 4, wherein the received communication comprises one or more of a new email message, a new text message, or a new voicemail message.

6. An electronic device comprising:
Radio Frequency Identification (RFID) circuitry comprising:
an antenna;
a first memory for storing first data;
a second memory for storing second data; and
selection circuitry operative to select either the first or second memory for providing either the first data or the second data for transmission by the antenna, wherein the selection is based on a selection signal; and
a processor operative to provide the selection signal to the RFID circuitry, wherein a state of the selection signal changes in response to receiving a software event, wherein the software event indicates a user interaction with media.

7. The electronic device of claim 6, wherein the software event comprises one or more of a playback of a song, internet navigation, or purchase of assets.

8. An electronic device comprising:
a processor;
control circuitry configured to:
determine that a quantifiable event has occurred in software being executed by the processor; and
in response to the determining, provide data identifying the quantifiable event; and
Radio Frequency Identification (RFID) circuitry comprising rewritable memory, wherein the RFID circuitry is configured to:
in response to the providing, store the data identifying the quantifiable event in the rewritable memory; and
passively wirelessly transmit the data identifying the quantifiable event that is stored in the rewritable memory, wherein the data identifying the quantifiable event can be read from the rewritable memory by a reader device while the electronic device is powered off.

9. The device of claim 8, wherein the data stored in the rewritable memory of the RFID circuitry is associated with user interaction of media.

10. The device of claim 8, wherein the data stored in the rewritable memory of the RFID circuitry provides a status notification of the electronic device.

11. The device of claim 8, wherein the data stored in the rewritable memory of the RFID circuitry provides an error message.

12. The device of claim 8, wherein the data stored in the rewritable memory of the RFID circuitry is updated according to a predetermined interval.

13. The device of claim 8, wherein the data stored in the rewritable memory of the RFID circuitry is updated in response to user interaction with the device.

14. The device of claim 8 further comprising a communications bus for enabling the control circuitry to provide data to the RFID circuitry.

15. A method for using Radio Frequency Identification (RFID) circuitry in an electronic device, the method comprising:
determining, by the electronic device, that a quantifiable event has occurred in software being executed by a processor of the electronic device;
in response to the determining, storing data identifying the quantifiable event in rewritable memory of the RFID circuitry; and
passively wirelessly transmitting, via the RFID circuitry, the data identifying the quantifiable event that is stored in the rewritable memory, wherein the passively wirelessly transmitting occurs when the electronic device is powered off.

16. The method of claim 15, wherein the data stored in the rewritable memory of the RFID circuitry is associated with user interaction of media.

17. The method of claim 15, wherein the data stored in the rewritable memory of the RFID circuitry provides a status notification of the electronic device.

18. The method of claim 15, wherein the data stored in the rewritable memory of the RFID circuitry provides an error message.

19. The method of claim 15, wherein the data stored in the rewritable memory of the RFID circuitry is updated according to a predetermined interval.

20. The method of claim 15, wherein the data stored in the rewritable memory of the RFID circuitry is updated in response to user interaction with the device.

* * * * *